March 22, 1960  W. LANGERAK  2,929,457
CONTROL DEVICE FOR CULTIVATORS
Filed May 7, 1959
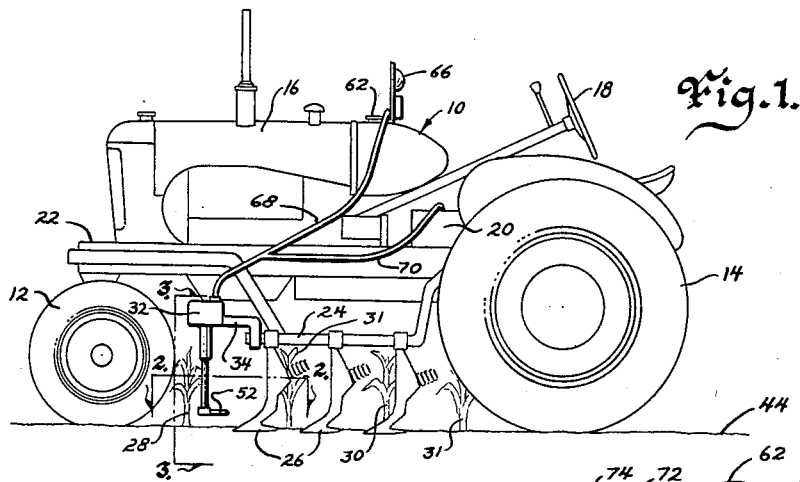
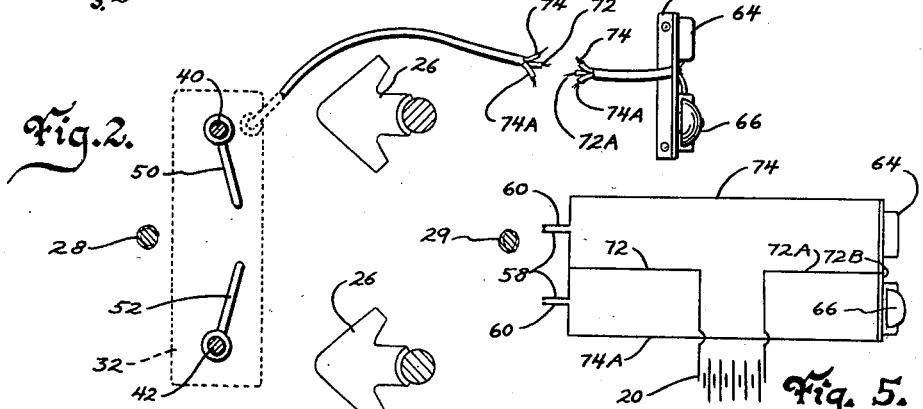
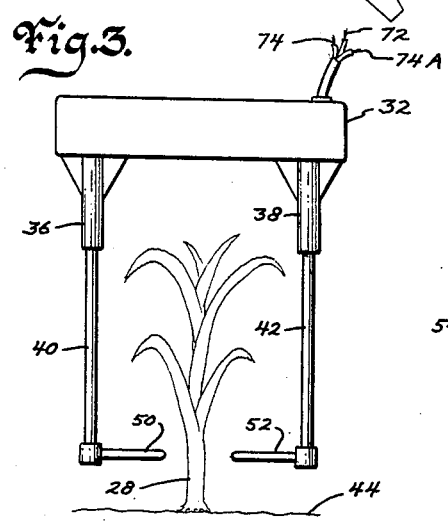
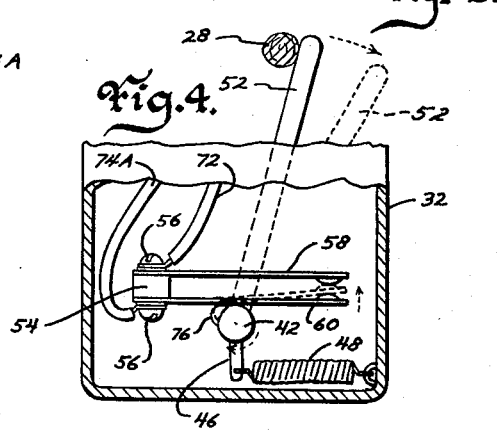
Inventor
Wiggert Langerak
by Donald H. Zarley
Attorney
Witness
Edward P. Seeley United States Patent Office 2,929,457
Patented Mar. 22, 1960

2,929,457

CONTROL DEVICE FOR CULTIVATORS

Wiggert Langerak, Pella, Iowa

Application May 7, 1959, Serial No. 811,600

5 Claims. (Cl. 172—430)

My invention relates to control devices for cultivators and more particularly to a control device which will help the operator to maintain his cultivator unit in proper relation to the crop being cultivated.

Multi-row cultivators are becoming more and more popular as the farm operation becomes modernized. Where a farmer could cultivate only one crop row at a time in years gone by, he can now cultivate simultaneously as many as six rows. However, one shortcoming of this modern equipment is that when the cultivator gets too close to the rows being cultivated, six plants instead of one plant perish. My invention is intended to help eliminate this problem.

The principal object of my invention is to provide a control device for cultivators to enable the cultivator operator to know when his cultivator is becoming disaligned with the crop row.

A further object of my invention is to provide a control device for cultivators that will inform the cultivator operator how to correct his disaligned cultivator.

A still further object of my invention is to provide a control device for cultivators that will not only prevent the crops from being dug up but will also prevent the roots of the growing crop from being undercut.

A still further object of my invention is to provide a control device for cultivators that will not in any way injure the growing crop.

A still further object of my invention is to provide a control device for cultivators that will not interfere with the successful operation of the cultivator units.

A still further object of my invention is to provide a control device for cultivators that is economical of manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a side elevational view of my device mounted on a farm tractor;

Fig. 2 is a schematic view of my device as viewed from above showing the relation of the growing crop, the cultivator shovels and the operating parts of my device;

Fig. 3 is a front elevational view of my device as it straddles a small corn plant;

Fig. 4 is a partial sectional view of my device showing the contact points; and

Fig. 5 is a wiring diagram of the electrical components of my device.

I have used the numeral 10 to designate a conventional farm tractor which has forward wheels 12, rearward wheels 14, motor unit 16, steering apparatus 18, battery 20, and frame 22.

A cultivator frame 24 is secured to the frame 22 of tractor 10 in any conventional manner. Three downwardly extending cultivator shovels 26 are secured to the cultivator frame 24 on each side of tractor 10.

A series of corn plants 28, 29, 30, and 31 are shown in Figs. 1 and 2 and these corn plants are aligned in a row which is the usual custom for growing corn. As shown in Fig. 2, pairs of cultivator shovels 26 are located on the cultivator frame 24 at such points so that a row of corn is adapted to pass between each pair of cultivator shovels. The connection between the row of corn and the cultivator shovels is clearly shown in Fig. 2.

My device is comprised of a housing 32 which can be connected in any convenient fashion to either the frame 22 of the tractor or the cultivator frame 24. I have shown housing 32 to be connected to the cultivator frame 24 by arm 34 in Fig. 1. Housing 32 can assume various shapes but I have shown it to be elongated in nature and capable of extending laterally across a row of corn. For example, see Fig. 3. Vertical bearing members 36 and 38 extend downwardly from the bottom of housing 32 at a point near the ends thereof. Elongated rods 40 and 42 extend downwardly from inside the housing 32 through the respective bearing members 36 and 38 and terminate a short distance above the ground level 44. Rods 40 and 42 are capable of rotating in their respective bearing members. A horizontal arm 46 can rigidly extend from the upper ends of rods 40 and 42 within housing 32 to prevent the rods from sliding downwardly through the bearing members. This arm 46 is clearly shown in Fig. 4. As also shown in Fig. 4, a spring 48 has one of its ends secured to arm 46 and the other end secured in any convenient fashion to the housing 32 so as to yieldably hold arm 46 and the rod 42 (or 40) in the position shown in that figure. Horizontal arms 50 and 52 are secured to the lower ends of rods 40 and 42, respectively, and extend inwardly toward each other as shown in Fig. 3. As shown in Fig. 3, there is enough space between the inner ends of arms 50 and 52 for a corn plant to easily pass therebetween. As indicated above, the spring 48 will also yieldably maintain the arm 52 (and 50) in the position shown by the solid lines in Fig. 4.

An insulated post 54 is mounted in any convenient fashion on the inside bottom of housing 32 at either end thereof and each post 54 has two resilient electrical contact arms secured to its opposite side by screw elements 56. As shown in Fig. 4, the electrical contact arms 58 and 60 are normally in a spaced apart condition.

A bracket 62 is secured in any convenient fashion to the top of tractor 10 in the close proximity of the steering apparatus 18 and an electrical buzzer 64 and an electrical bell 66 are secured to this bracket 62. Electrical conduit 68 electrically connects the buzzer 64 and bell 66 with the contact points 58 and 60 within housing 32. Conduit 70 electrically connects the battery 20 with the electrical contact arms 58 within housing 32. As shown in Fig. 1, the conduits 68 and 70 may be spliced together.

Fig. 5 illustrates the wiring diagram whereby my device is operated. As shown in Fig. 5, wire 72 connects electrical contact arms 58 with battery 20. Wire 72 can extend from housing 32 in conduit 68 and then proceed on to battery 20 through conduit 70. Wire 72A then connects the other pole of battery 20 with pole 72B which is electrically connected to both buzzer 64 and bell 66. Wire 72A can extend through conduit 70 and thence through conduit 68 to the bell and buzzer units. Wire 74 electrically connects electrical contact arm 60 in housing 32 with the side of buzzer 64 opposite to pole 72B. Wire 74 extends through conduit 68. Wire 74A electrically connects the other electrical contact arm 60 with the side of bell 66 opposite to pole 72B. Thus, when the topmost pair of electrical contact arms 58 and 60, as viewed in Fig. 5, are closed, the circuit for the buzzer 64 will be completed through wire 72, battery 20, wire 72A, buzzer 64, and thence wire 74. When the other pair of electrical contact arms 58 and 60 are closed, the circuit for the bell 66 will be completed through wire 72, battery 20, wire 72A, bell 66, and wire 74A.

As shown in Fig. 4, an insulated lug 76 can be secured in any convenient fashion to the top ends of rods 40 and 42 so that when the rods are rotated about their longitudinal axes, the lug will engage resilient electrical contact arm 60 and force it into physical contact with the contact arm 58.

The normal operation of my device is as follows: During the cultivating operation, the rods 40 and 42 will straddle a row of corn being cultivated as shown in Fig. 3. The rods 40 and 42 will travel ahead of the cultivator shovels 26 and the arms 50 and 52 will be in the position shown by the solid lines in Figs. 3 and 4. The spring 48 will yieldably hold arm 46, rod 42 (and rod 40) and arm 52 (and arm 50) in this inoperative position. However, if the direction of travel of the tractor and the cultivator deviates to the right, the arm 52 on the lower end of rod 42 will come into engagement with one of the corn plants as shown in Fig. 4. The forward motion of the tractor combined with the resistance of the corn plant will force the arm 52 in the direction of the arrows shown in Fig. 4. This will cause the arm 52 to rotate to the position shown by the dotted lines in Fig. 4 which, in turn, will cause the rod 42 to rotate about its own axis. This rotation of rod 42 will cause spring 48 to expand and will also cause lug 46 to bear against resilient electrical contact arm 60 so that the contact arm 60 will physically engage the contact arm 58. This action will close the electrical circuit of the bell 66 and will cause the bell to ring. The ringing of bell 66 will be a signal to the operator that the direction of travel of the tractor and cultivator must be immediately corrected to the left. Similarly, if the direction of travel of the tractor and cultivator has deviated to the left, the contact arms 58 and 60 in the opposite end of housing 32 will close upon each other to close the circuit for buzzer 64. The buzzer 64 will then signal the operator that the direction of travel should be corrected in an opposite manner. Obviously, a buzzer and a bell are only two of several combinations which could indicate to the operator the manner in which his course of travel should be corrected. Different colored lights would be another possibility that would work equally as well.

As soon as the deflected arm 52 has passed by the corn plant, the expanded spring 48 will contract and will once again move rod 42 and arm 52 back to their original position. This action will release lug 76 from the contact arm 60 and the electrical circuit will thereupon be broken. Thus, as soon as the tractor operator corrects the direction of travel of the unit, the corn plants will no longer engage either of the arms 50 or 52 and the buzzer 64 and the bell 66 will cease to operate.

Thus, from the foregoing, it is seen that my device will accomplish at least all of its stated objectives.

Some changes may be made in the construction and arrangement of my control device for cultivators without departing from the real spirit and purpose of my invention, and it is my intention to cover by my claims, any modified forms of structure or use of mechanical equivalents which may be reasonably included within their scope.

I claim:

1. In combination with a cultivator mechanism having a frame and at least two cultivator shovels rigidly secured thereto, said cultivator shovels extending downwardly from said frame and adapted to cultivate the ground on each side of a rowed crop, a housing secured to said frame forwardly of said cultivator shovels, a yieldable means secured to said housing and capable of engaging said rowed crop whenever said cultivator shovels become disaligned with said rowed crop, and a signal means on said frame operatively connected to said yieldable means.

2. In combination with a cultivator mechanism having a frame and at least two cultivator shovels rigidly secured thereto, said cultivator shovels extending downwardly from said frame and adapted to cultivate the ground on each side of a rowed crop, a housing secured to said frame forwardly of said cultivator shovels, yieldable means secured to said housing and extending on either side of said rowed crop and capable of engaging said rowed crop whenever said cultivator shovels become disaligned with said rowed crop, and separate signal means on said frame operatively connected to said yieldable means, respectively, on either side of said rowed crop.

3. In combination with a cultivator mechanism having a frame and at least two cultivator shovels rigidly secured thereto, said cultivator shovels extending downwardly from said frame and adapted to cultivate the ground on each side of a rowed crop, a housing secured to said frame forwardly of said cultivator shovels, rods rotatably mounted in said housing and extending downwardly therefrom on each side of said rowed crop, arms on the lower ends of said rods extending laterally toward each other so that one or the other of said arms will engage said rowed crop whenever said cultivator shovels become disaligned with said rowed crop, separate signal means on said frame, and means operatively connecting said signal means and said rods so that said signal means will be actuated whenever said arms engage said rowed crop.

4. In combination with a cultivator mechanism having a frame and at least two cultivator shovels rigidly secured thereto, said cultivator shovels extending downwardly from said frame and adapted to cultivate the ground on each side of a rowed crop, a housing secured to said frame forwardly of said cultivator shovels, rods rotatably mounted in said housing and extending downwardly therefrom on each side of said rowed crop, arms on the lower ends of said rods extending laterally toward each other so that one or the other of said arms will engage said rowed crop whenever said cultivator shovels become disaligned with said rowed crop, separate signal means on said frame, and means operatively connecting said signal means and said rods so that said signal means will be actuated whenever said arms engage said rowed crop; said signal means each having a different signal.

5. In combination with a cultivator mechanism having a frame and at least two cultivator shovels rigidly secured thereto, said cultivator shovels extending downwardly from said frame and adapted to cultivate the ground on each side of a rowed crop, a housing secured to said frame forwardly of said cultivator shovels, rods rotatably mounted in said housing and extending downwardly therefrom on each side of said rowed crop, arms on the lower ends of said rods extending laterally toward each other so that one or the other of said arms will engage said rowed crop whenever said cultivator shovels become disaligned with said rowed crop, means in said housing for yieldably holding said rods in a position that said arms will extend laterally toward each other, separate signal means on said frame, and means operatively connecting said signal means and said rods so that said signal means will be actuated whenever said arms engage said rowed crop.

References Cited in the file of this patent

UNITED STATES PATENTS

| | | |
|---|---|---|
| 1,303,798 | Janes | May 13, 1919 |
| 1,609,734 | Meyers | Dec. 7, 1926 |
| 1,769,038 | Ronning et al. | July 1, 1930 |
| 2,484,069 | Boncompain | Oct. 11, 1949 |
| 2,492,531 | Lee | Dec. 27, 1949 |